(12) United States Patent
Su et al.

(10) Patent No.: US 11,579,656 B2
(45) Date of Patent: Feb. 14, 2023

(54) ELECTRONIC DEVICE

(71) Applicant: Lenovo (Beijing) Co., Ltd., Beijing (CN)

(72) Inventors: Yuefeng Su, Beijing (CN); Tingting Feng, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 142 days.

(21) Appl. No.: 17/209,793

(22) Filed: Mar. 23, 2021

(65) Prior Publication Data

US 2021/0405704 A1   Dec. 30, 2021

(30) Foreign Application Priority Data

Jun. 30, 2020   (CN) .......................... 202010622276.9

(51) Int. Cl.
*G06F 1/16*   (2006.01)

(52) U.S. Cl.
CPC .......... *G06F 1/1652* (2013.01); *G06F 1/1656* (2013.01)

(58) Field of Classification Search
CPC .............................. G06F 1/1652; G06F 1/1656
See application file for complete search history.

(56) References Cited

U.S. PATENT DOCUMENTS

| 2018/0059727 A1* | 3/2018 | Seo ........................ G06F 1/1656 |
| 2021/0181807 A1* | 6/2021 | Mehandjiysky ...... G06F 1/1652 |

FOREIGN PATENT DOCUMENTS

| CN | 108831301 A | 11/2018 |
| CN | 108898957 A | 11/2018 |
| CN | 110752232 A | 2/2020 |

* cited by examiner

*Primary Examiner* — Anthony Q Edwards

(74) *Attorney, Agent, or Firm* — Anova Law Group, PLLC

(57) ABSTRACT

An electronic device includes a display assembly for displaying images and including a first part and a second part disposed at different sides of a first deformable part of the display assembly, where a first deformability of at least a part of the display assembly includes capability to change a relative angle between the first part and the second part; and a fixing assembly coupled to the display assembly for fixedly connect the display assembly, the fixing assembly including at least a first fixing element. At least a part of at least one of the first fixing element or the display assembly has a second deformability including capability to change a length in a preset direction.

13 Claims, 4 Drawing Sheets

ELECTRONIC DEVICE

CROSS-REFERENCE TO RELATED APPLICATION

This application claims priorities to Chinese Patent Application No. 202010622276.9 filed on Jun. 30, 2020, the entire content of which is incorporated herein by reference.

TECHNICAL FIELD

The present disclosure relates to the technical field of electronics and, more particularly, to an electronic device.

BACKGROUND

As the display technology advances, more and more electronic devices are equipped with a flexible display screen, such that the flexible display screen of the electronic devices is bendable to satisfy user's diverse display requirements. When the flexible display screen is bended, a part of the flexible display screen overlaps with another part of the flexible display screen. However, during operation of the flexible display screen of the existing electronic devices, a bending region of the flexible display screen often has a high failure rate. Thus, the reliability of the flexible display screen of the electronic devices needs to be improved.

SUMMARY

The present disclosure also provides an electronic device. The electronic device includes a display assembly for displaying images and including a first part and a second part disposed at different sides of a first deformable part of the display assembly, where a first deformability of at least a part of the display assembly includes capability to change a relative angle between the first part and the second part; and a fixing assembly coupled to the display assembly for fixedly connect the display assembly, the fixing assembly including at least a first fixing element. At least a part of at least one of the first fixing element or the display assembly has a second deformability including capability to change a length in a preset direction.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

Embodiments of the present disclosure are described in detail below with reference to the accompanying drawings. It will be appreciated that the described embodiments are some rather than all of the embodiments of the present disclosure. Other embodiments obtained by those having ordinary skills in the art on the basis of the described embodiments without inventive efforts should fall within the scope of the present disclosure. In addition, under circumstances of no conflict, the embodiments and the features in the embodiments may be combined with each other.

In the following description, many details are explained in order to fully comprehend the present disclosure. However, the present disclosure can also be implemented in other ways different from those described herein. Those skilled in the art may do so without departing from the scope of the present disclosure. Therefore, the present disclosure is not limited by the embodiments described below.

As described in the background section, during the operation of the existing electronic devices, the bendable region often has the high failure rate and the reliability of the electronic devices with the bendable display screen needs to be improved.

Figure 1:
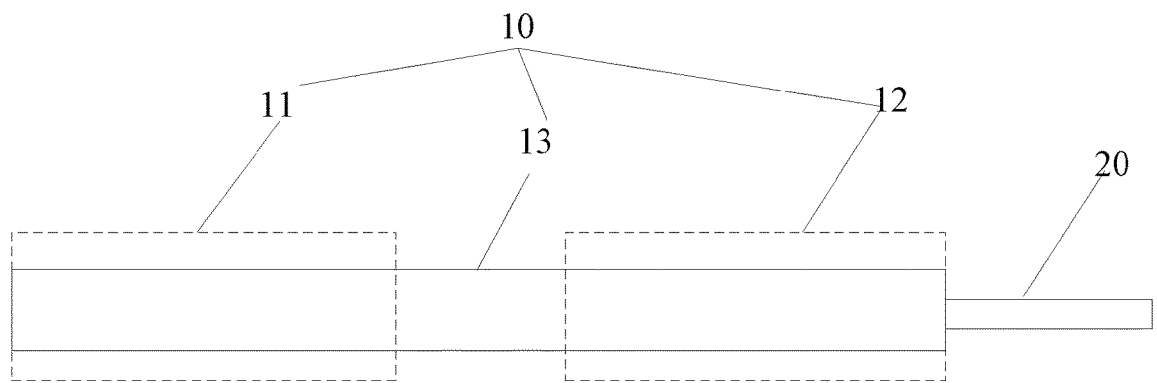
FIG. 1 is a structural diagram illustrating an exemplary electronic device according to some embodiments of the present disclosure.

As such, the present disclosure provides an electronic device. FIG. 1 is a structural diagram illustrating an exemplary electronic device according to some embodiments of the present disclosure. As shown in FIG. 1, the electronic device includes a display assembly 10 for displaying images and a fixing assembly coupled to the display assembly 10 for fixing the display assembly 10.

At least a part of the display assembly 10 has a first deformability. The display assembly 10 also includes a first part 11 and a second part 12, which are disposed on two different sides of a first deformable part 13. The first deformable part 13 is the part of the display assembly 10 having the first deformability and is capable of changing a relative angle between the first par 11 and the second part 12, such that various angles may be formed between the first part 11 and the second part 12 of the display assembly 10 to make the display assembly 10 have various attitudes.

The fixing assembly includes at least a first fixing element 20. At least a part of at least one of the first fixing element 20 or the display assembly 10 has a second deformability. The second deformability is capable of changing a length in a preset direction.

In some embodiments, at least a part of the first fixing element 20 has the second deformability. The second deformability is capable of changing a length of a second fixing element 40 in the preset direction. The second deformability makes an end of the display assembly 10 connected to the first fixing element 20 be at a free sliding state, capable of absorbing deformation caused by a change of the relative angle between the first part 11 and the second part 12. As such, during a process of changing the relative angle between the first part 11 and the second part 12, a stress on the first deformable part 13 of the display assembly 10 is mitigated, and the failure rate of the first deformable part 13 of the display assembly 10 is reduced. Thus, the reliability of the electronic device is improved.

In some embodiments, the second deformability of at least a part of the first fixing element 20 may be the deformability of only a part of the first fixing element 20 or of the entire first fixing element 20. That is, any and every part of the first fixing element 20 has the second deformability. It depends on specific circumstances and is not limited by the present disclosure.

In some embodiments, at least a part of the display assembly 10 has the second deformability. The second deformability is capable of changing the length of the display assembly 10 in the preset direction. As such, in the process of changing the relative angle between the first part 11 and the second part 12, the second deformability of the display assembly 10 mitigates the stress on the first deformable part 13 of the display assembly 10, and reduces the failure rate of the first deformable part 13 of the display assembly 10 in the process of changing the relative angle between the first part 11 and the second part 12. Thus, the reliability of the electronic device is improved.

In some embodiments, changing the relative angle between the first part 11 and the second part 12 may be increasing the relative angle between the first part 11 and the second part 12 or decreasing the relative angle between the first part 11 and the second part 12. It depends on specific circumstances and is not limited by the present disclosure. The relative angle between the first part 11 and the second part 12 refers to an angle formed between the first part 11 and the second part 12.

In some embodiments, when the relative angle between the first part 11 and the second part 12 is between 0° and 180° excluding 180°, the first part 11 and the second part 12 are facing toward each other. That is, the display assembly 10 is in an inward bended attitude. In some other embodiments, when the relative angle between the first part 11 and the second part 12 is between 0° and 180° excluding 180°, the first part 11 and the second part 12 are facing opposite to each other. That is, the display assembly 10 is in an outward bended attitude. It depends on specific circumstances and is not limited by the present disclosure.

Figure 2:
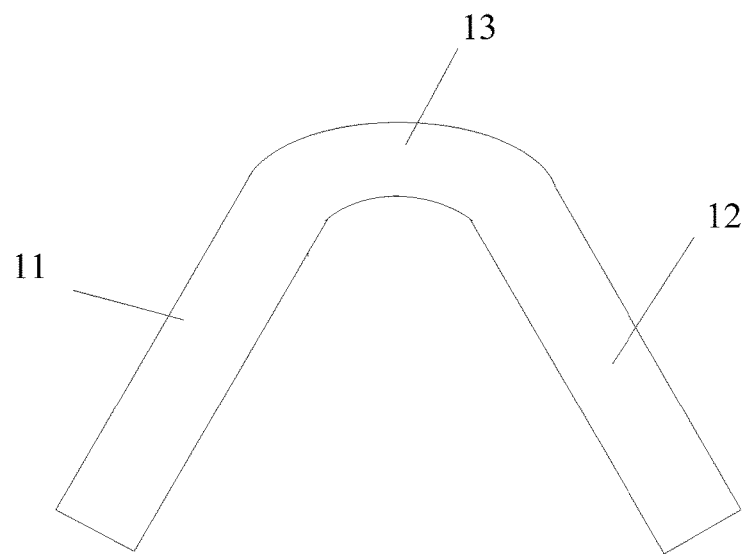
FIG. 2 is a schematic diagram illustrating a display assembly of an exemplary electronic device in a second attitude according to some embodiments of the present disclosure.

In some embodiments, the first deformability supports switching the display assembly 10 from a first attitude to a second attitude. In the first attitude, as shown in FIG. 1, the first part 11 and the second part 12 of the display assembly 10 satisfy a coplanar condition. In the second attitude, as shown in FIG. 2, the first part 11 and the second part 12 satisfy an overlapping condition.

In some embodiments, the coplanar condition satisfied by the first part 11 and the second part 12 of the display assembly 10 may be that the first part 11 and the second part 12 of the display assembly 10 are located at a same plane or that the first part 11 and the second part 12 of the display assembly 10 are located almost at a same plane. That is, in the embodiments of the present disclosure, the first part 11 and the second part 12 of the display assembly 10 are located at the same plane or first part 11 and the second part 12 of the display assembly 10 are located almost at the same plane. In this case, the display assembly 10 is in an extended attitude. The overlapping condition satisfied by the first part 11 and the second part 12 of the display assembly 10 may be that the first part 11 and the second part 12 of the display assembly 10 are at least partially overlapped. That is, the relative angle between the first part 11 and the second part 12 of the display assembly 10 is not equal to 180°, and the display assembly 10 is in a bended attitude.

In some embodiments, although only the first attitude and the second attitude are described, and the first deformability supports switching the display assembly 10 from the first attitude and the second attitude. The present disclosure is not limited thereto. In some other embodiments, the first deformability also supports switching the display assembly 10 from the second attitude to the first attitude, and the display assembly 10 may have additional attitudes. When the display assembly 10 has other attitudes, the first deformability supports switching the display assembly 10 between any two attitudes depending specific circumstances.

In practical applications, after the display assembly 10 is switched from the bended attitude to the extended attitude, a residual stress may still exist when the display assembly 10 is previously switched from the extended attitude to the bended attitude, which may prevent the first deformable part from resuming its initial state and causes wrinkles at the first deformable part of the display assembly 10. This is more likely to occur after the attitude of display assembly 10 has been switched multiple times.

In some embodiments, in the first attitude, the first fixing element 20 provides a pulling force to the display assembly 10. Pulled by the pulling force, the first part 11 and the second part 12 are moving away from each other to mitigate the wrinkles occurred at the first deformable part 13 of the display assembly 10.

In some embodiments, in the first attitude, the first fixing element 20 provides the pulling force to the display assembly 10. Pulled by the pulling force, the first part 11 and the second part 12 are moving away from each other to make the first part 11, the second part 12, and the first deformable part 13 of the display assembly 10 satisfy the coplanar condition, thereby avoiding the wrinkles occurred at the first deformable part 13 of the display assembly 10.

In some embodiments, in the first attitude, the pulling force provided by the first fixing element 20 to the display assembly 10 is greater than a force keeping the first deformable part 13 of the display assembly 10 in a wrinkle state, such that the pulling force provided by the first fixing element 20 to the display assembly 10 flattens a region of the first deformable part of the display assembly 10 where the wrinkles occur. Thus, in the first attitude, the first part 11, the second part 12, and the first deformable part 13 of the display assembly 10 satisfy the coplanar condition.

In some embodiments, satisfying the coplanar condition by the first part 11, the second part 12, and the first deformable part 13 of the display assembly 10 includes that the first part 11, the second part 12, and the first deformable part 13 of the display assembly 10 are located at the same plane or that the first part 11, the second part 12, and the first deformable part 13 of the display assembly 10 are located almost at the same plane. If the first part 11 and the second part 12 are located at the same plane, satisfying the coplanar condition includes that the first deformable part 13 of the display assembly 10 are located almost at the same plane as the first part 11 and the second part 12 or that the first part 11 and the first deformable part 13 of the display assembly 10 are located at the same plane and the second part 12 is located almost at the same plane as the first part 11 and the first deformable part of the display assembly 10 or that any two of the first part 11, the second part 12, and the first deformable part of the display assembly 10 are located almost at the same plane.

In some embodiments, the second deformability is capable of resuming to a natural state in a direction opposite to the preset direction. In some embodiments, in the first attitude, the first fixing element 20 tends to resume the natural state in the direction opposite to the preset direction. The tendency of the first fixing element 20 resuming the natural state provides the pulling force to the display assembly 10 to make the first part 11 and the second part 12 have at least a tendency to move away from each other.

In some embodiments, the at least tendency of the first part 11 and the second part 12 to move away from each other includes that the first part 11 and the second 12 only have the tendency to move away from each other but have not move away from each other or that the first part 11 and the second part 12 not only have the tendency to move away from each other, but also move away from each other. It depends on specific circumstances and is not limited by the present disclosure.

In some embodiments, at least a part of the first fixing element 20 and at least a part of the display assembly 10 both have the second deformability. A deformation trigger threshold of the second deformability of the second deformable part of the first fixing element 20 is smaller than the deformation trigger threshold of the second deformability of the second deformable part of the display assembly 10. That is, a stiffness coefficient of the second deformable part of the first fixing element 20 is smaller than the stiffness coefficient of the second deformable part of the display assembly 10. In the processing of changing the relative angle between the first part 11 and the second part 12, the deformable part of the first fixing element 20 deforms before the deformable part of the display assembly 10 deforms. Thus, the stress that occurs in the process of changing the relative angle between the first part 11 and the second part 12 is first applied to the first fixing element 20, thereby reducing the failure rate of the display assembly 10 due to the stress.

Moreover, when the deformation trigger threshold of the second deformability of the second deformable part of the first fixing element 20 is smaller than the deformation trigger threshold of the second deformability of the second deformable part of the display assembly 10, in the process of changing the relative angle between the first part 11 and the second part 12, the first fixing element 20 extends first before the display assembly 10 extends, thereby avoiding the wrinkles that occur when the display assembly 10 resumes to the initial state after being pulled.

The stiffness coefficient, also known as rigidity coefficient or firmness coefficient (i.e., elastic coefficient), is used to describe a magnitude of an elastic force generated by a unit amount of deformation. The greater the stiffness coefficient, the greater force needed for a unit length of deformation. The smaller the stiffness coefficient, the smaller force needed for the unit length of deformation. Taking a spring as an example, the stiffness coefficient is numerically equal to the elastic force when the spring is extended (or shortened) per unit length.

In some embodiments, when the length in the preset direction of at least one of the first fixing element 20 or the display assembly 10 changes, the length of the electronic device in the present direction may also change. The present disclosure does not limit thereto. In some other embodiments, when the length in the preset direction of at least one of the first fixing element 20 or the display assembly 10 changes, the length of the electronic device in the present direction may not change. It depends on specific circumstances and is not limited by the present disclosure.

In the following description, when the length in the preset direction of at least one of the first fixing element 20 or the display assembly 10 changes, the length of the electronic device in the present direction may also change.

In some embodiments, the preset direction includes a first direction. The second deformability capable of changing a length in the first direction changes the length of the electronic device in the first direction.

In some embodiments, at least a part of the first fixing element 20 has the second deformability. The second deformability is capable of changing the length of the first fixing element 20 in the first direction and hence changing the length of the electronic device in the first direction. In some embodiments, at least a part of the display assembly 10 has the second deformability. The second deformability is capable of changing the length of the display assembly 10 in the first direction and hence changing the length of the electronic device in the first direction. In some embodiments, at least a part of the first fixing element 20 and at least a part of the display assembly 10 both have the second deformability. The second deformability is capable of changing the length of the first fixing element 20 in the first direction and the length of the display assembly 10 in the first direction and hence changing the length of the electronic device in the first direction.

In some embodiments, the electronic device includes a first surface having a first side and a second side opposite to each other. In the first attitude, the first surface of the electronic device and a display panel of the display assembly 10 satisfy the coplanar condition. The first side is located at a side of first part 11 facing away from the second part 12. The second side is located at a side of the second part 12 facing away from the first part 11. In some embodiments, the length of the electronic device in the first direction is a distance between the first side and the second side of the first surface.

In some embodiments, at least a part of the first fixing element 20 has the second deformability. The display assembly 10 does not have the second deformability. A maximum amount of deformation supported by the first fixing element 20 is greater than a maximum extension length of the electronic device. As such, when the electronic device is bended to the maximum extent, breakage or failure of the of at least a part of the display assembly 10 is avoided. In some embodiments, the first fixing element 20 does not have the second deformability. At least a part of the display assembly 10 has the second deformability. The maximum amount of deformation supported by the display assembly 10 is greater than the maximum extension length of the electronic device. As such, when the electronic device is bended to the maximum extent, breakage or failure of the at least a part of the display assembly 10 is avoided. In some embodiments, at least a part of the first fixing element 20 has the second deformability. At least a part of the display assembly 10 has the second deformability. A sum of the maximum amount of deformation supported by the first fixing element 20 and the maximum amount of deformation supported by the display assembly 10 is greater than the maximum extension length of the electronic device. As such, when the electronic device is bended to the maximum extent, breakage or failure of the of at least a part of the display assembly 10 is avoided.

In some embodiments, the maximum extension length of the electronic device refers to an amount of increase of the length of the electronic device in the first direction when the electronic device is bended to the maximum extent as compared to the length of the electronic device in the first direction when the electronic device is at the extended state.

In some embodiments, the preset direction includes a second direction. The second deformability is capable of changing the length in the second direction. The second direction is perpendicular to the display panel. That is, the second direction is perpendicular to a plane where the display panel is located or is approximately perpendicular to the plane where the display panel is located.

In some embodiments, at least a part of the first fixing element 20 has the second deformability. The second deformability is capable of changing the length of the first fixing element 20 in the second direction. In some other embodiments, at least a part of the display assembly 10 has the second deformability. The second deformability is capable of changing the length of the display assembly 10 in the second direction.

In some embodiments, the first fixing element 20 may be fixedly connected to the first part 11 or the second part 12. It depends on specific circumstances and is not limited by the present disclosure.

In some embodiments, in the first attitude, the first fixing element 20 and the display assembly 10 satisfy the coplanar condition. That is, the first fixing element 20 is disposed at a side of the display assembly 10.

Figure 3:
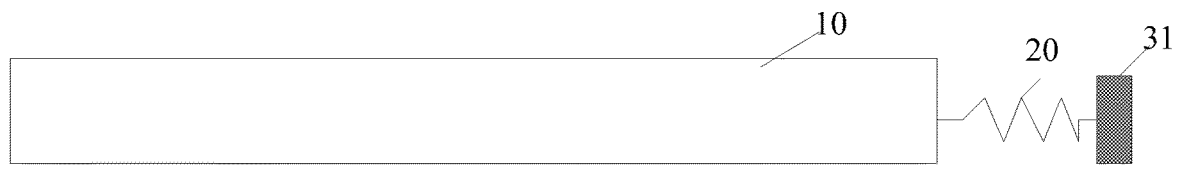
FIG. 3 is a structural diagram illustrating another exemplary electronic device according to some embodiments of the present disclosure.

In some embodiments, as shown in FIG. 3, the electronic device includes a first structural member 31 located at a side of the display assembly 10. The first fixing element 20 is located between the display assembly 10 and the first structural member 31. A first end of the first fixing element 20 is connected to an end surface of the display assembly 10 facing toward the first structural member 31. A second end of the first fixing element 20 is connected to an end surface of the first structural member 31 facing toward the display assembly 10. That is, the first fixing element 20 is located at a side of the display assembly 10.

In some embodiments, because the first structural member 31 is located at the side of the display assembly 10, and the first fixing element 20 is located between the side of the display assembly 10 and the first structural member 31, the second deformability of the first fixing element 20 is capable of changing the length in the direction from the connection end between the first fixing element 20 and the display assembly 10 to the connection end between the first fixing element 20 and the first structural member 31.

In some embodiments, when the display assembly 10 is in the first attitude, the direction along the first fixing element 20 from the connection end between the first fixing element 20 and the display assembly 10 to the connection end between the first fixing element 20 and the first structural member 31 and the first direction satisfy the coplanar condition. That is, the direction along the first fixing element 20 from the connection end between the first fixing element 20 and the display assembly 10 to the connection end between the first fixing element 20 and the first structural member 31 and the first direction are located in the same plane or almost in the same plane. It depends on specific circumstances and is not limited by the present disclosure.

Figure 4:
FIG. 4 is a structural diagram illustrating another exemplary electronic device according to some embodiments of the present disclosure.

In some embodiments, the first structural member 31 may be arranged around the display assembly 10 as shown in FIG. 4, or may be located in certain regions around the display assembly 10, as shown in FIG. 3. The present disclosure does not limit thereto. As long as it is ensured that at least a part of the first structural member 31 is located in certain regions around the display assembly 10, the first fixing element 20 may be located between the side of the display assembly 10 and the first structural member 31, and the display assembly 10 and the first structural member 31 are fixedly connected.

In some embodiments, the first structural member 31 may not be located at the side of the display assembly 10, and instead, may be located beneath the display assembly 10. As such, the second deformability of the first fixing element 20 is capable of changing the length of first fixing element 20 in the second direction. It depends on specific circumstances and is not limited by the present disclosure.

The electronic device consistent with the embodiments of the present disclosure is described below assuming that the first structural member 31 is located at the side of the display assembly 10.

In some embodiments, the first fixing element 20 is an elastic element having the second deformability. The elastic feature of the first fixing element 20 is capable of changing the length of the first fixing element 20 in the preset direction.

Figure 5:
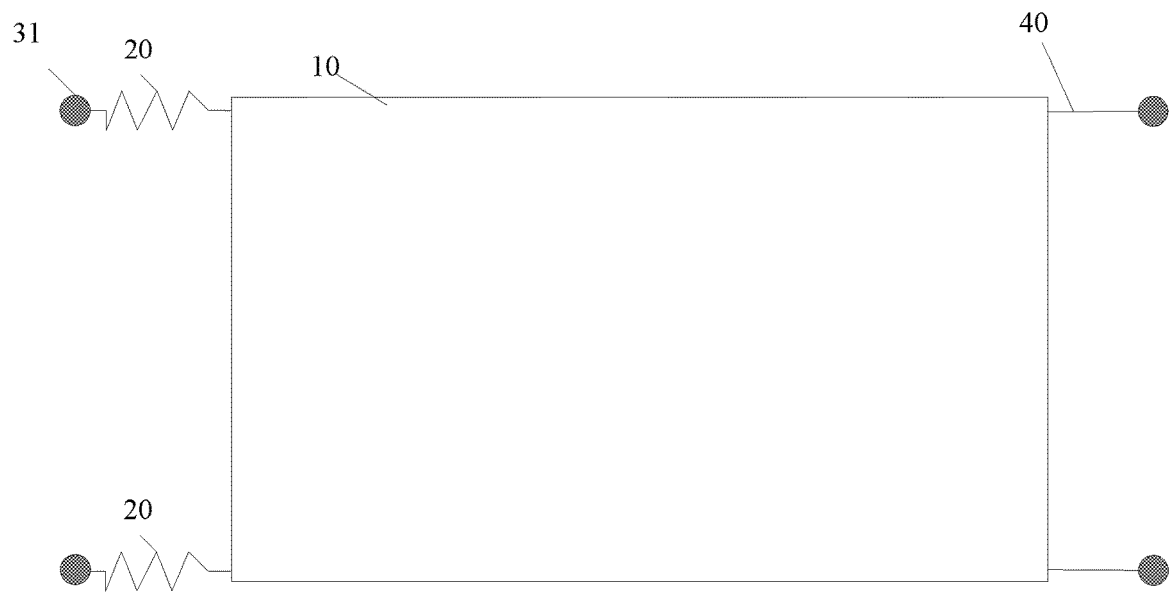
FIG. 5 is a structural diagram illustrating another exemplary electronic device according to some embodiments of the present disclosure.

In some embodiments, as shown in FIG. 5, a fixing assembly includes two first fixing elements 20 and two second fixing elements 40. The display assembly 10 includes the first side and the second side opposite to each other. The two first fixing elements 20, located between the first side of the display assembly 10 and the end surface of the first structural member 31 facing toward the first side, fixedly connect the display assembly 10 and the first structural member 31. The two second fixing elements 40, located between the second side of the display assembly 10 and the end surface of the first structural member 31 facing toward the second side, fixedly connect the display assembly 10 and the first structural member 31.

In some embodiments, the first side is the side of the first part 11 facing away from the second part 12, and the second side is the side of the second part 12 facing away from the first part 11. The two first fixing elements 20 and the first part 11 are fixedly connected, and the two second fixing elements 40 and the second part 12 are fixedly connected. The present disclosure does not limit thereto. In some other embodiments, the two first fixing elements 20 and the second part 12 are fixedly connected, and the two second fixing elements 40 and the first part 11 are fixedly connected. It depends on specific circumstances and is not limited by the present disclosure.

For illustration purpose, the first fixing elements 20 and the first part 11 are fixedly connected. In some embodiments, the display assembly 10 further includes a third side and a fourth side, which are connected to the first side and the second side. One of the two first fixing elements 20 is fixed to a region of the first side adjacent to the third side. Another first fixing element 20 is fixed to a region of the first side adjacent to the fourth side. It depends on specific circumstances and is not limited by the present disclosure.

In some embodiments, the two first fixing elements 20 have the second deformability. The two second fixing elements 40 do not have the second deformability. The second deformability of the two first fixing elements 20 mitigates the stress on the first deformable part 13 of the display assembly 10 in the process of changing the relative angle between the first part 11 and the second part 12, reduces the failure rate of the first deformable part 13 of the display assembly 10, and improves the reliability of the electronic device.

Figure 6:
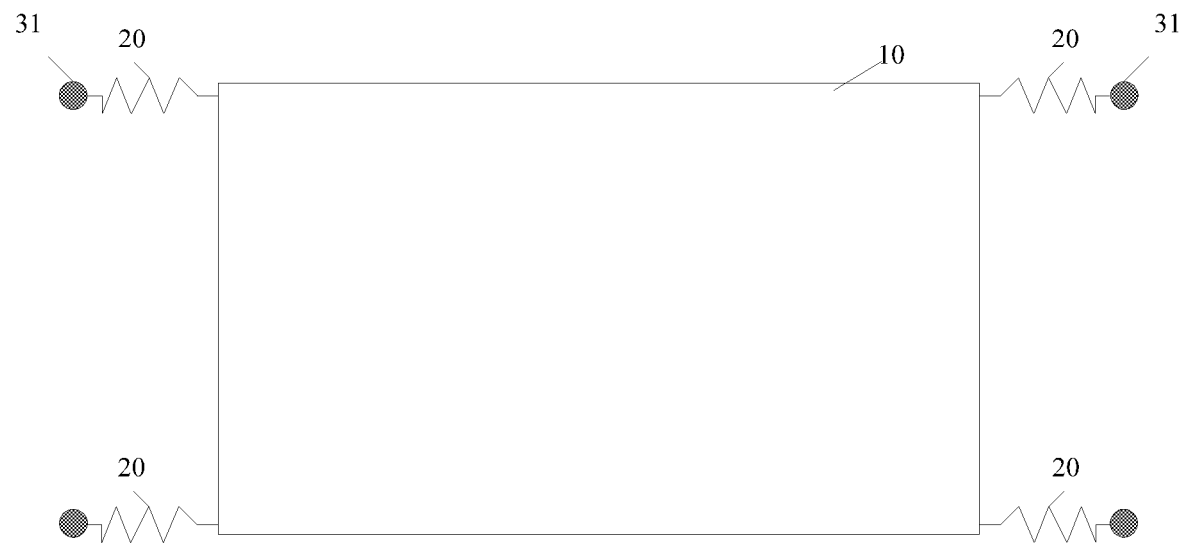
FIG. 6 is a structural diagram illustrating another exemplary electronic device according to some embodiments of the present disclosure.

In some embodiments, as shown in FIG. 6, the fixing assembly includes four first fixing elements 20. The fixing assembly includes the first side and the second side opposite to each other. Two of the four first fixing elements 20, located between the first side of the display assembly 10 and the end surface of the first structural member 31 facing toward the first side, fixedly connect the display assembly 10 and the first structural member 31. Another two first fixing elements 20, located between the second side of the display assembly 10 and the end surface to the first structural member 31 facing toward the second side, fixedly connect the display assembly 10 and the structural member 31. The second deformability of the four first fixing elements 20 mitigate the stress on the first deformable part 13 of the display assembly 10 in the process of changing the relative angle between the first part 11 and the second part 12, reduces the failure rate of the first deformable part 13 of the display assembly 10, and improves the reliability of the electronic device.

In some embodiments, the four first fixing elements 20 are evenly distributed around the sides of the display assembly 10. Specifically, in some embodiments, the display assembly 10 includes four sides. The four first fixing elements 20 are located at transition regions between any two adjacent sides of the four sides. The present disclosure does not limit thereto. In some embodiments, the four first fixing elements 20 may also be disposed differently, for example, in connection regions between adjacent sides of the display assembly 10. It depends on specific circumstances and is not limited by the present disclosure.

In some embodiments, the first fixing element 20 may be an elastic element such as a spring element or a rubber element. The present disclosure does not limit thereto. In some embodiments, the first fixing element 20 may also be a retractable rod. It depends on specific circumstances and is not limited by the present disclosure.

In some embodiments, in the first attitude, the first fixing element 20 may not satisfy the coplanar condition with the display assembly 10. Correspondingly, the first fixing element 20 may be stacked with the display assembly 10 or may form an angle with the display assembly 10. It depends on specific circumstances and is not limited by the present disclosure.

When the first fixing element 20 is stacked with the display assembly 10 and at least a part of the first fixing element 20 has the second deformability, the second deformability is capable of changing the length of the first fixing element 20 in the centerline direction of the first fixing element 20. The centerline direction of the first fixing element 20 may satisfy the coplanar condition with the first direction, or may satisfy the coplanar condition with the second direction, or may form an angle with the first direction or the second direction. It depends on specific circumstances and is not limited by the present disclosure.

Figure 7:
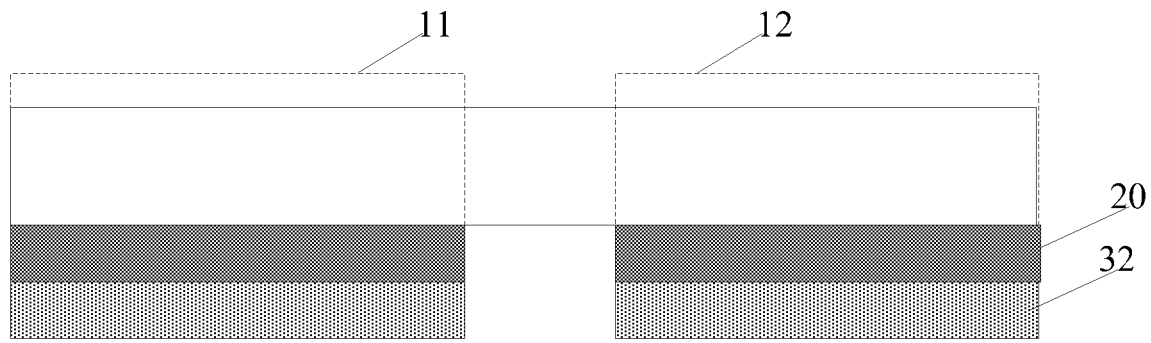
FIG. 7 is a structural diagram illustrating another exemplary electronic device according to some embodiments of the present disclosure.

In some embodiments, as shown in FIG. 7, the electronic device further includes a structural member. The structural member includes a second structural member 32 located at a side of the display assembly 10 facing away from the display panel. The first fixing element 20, located between the display assembly 10 and the second structural member 32, fixedly connect the display assembly 10 and the second structural member 32. The first fixing element 20 is an elastic element made of elastic material and has the second deformability. The elastic feature of the elastic element is capable of changing the length of the first fixing element 20 in the preset direction.

In some embodiments, the second deformability is capable of changing the length in a third direction. In some other embodiments, the second deformability is capable of change the length in a fourth direction. In some other embodiments, the second deformability is capable of changing the length in the third direction and the length in the fourth direction. It depends on specific circumstances and is not limited by the present disclosure.

In some embodiments, the third direction and a contact surface between the first fixing element 20 and the display assembly 10 satisfy the coplanar condition. That is, the third direction and the contact surface between the first fixing element 20 and the display assembly 10 are located in the same plane or approximately in the same plane. The fourth direction and the contact surface between the first fixing element 20 and the display assembly 10 satisfy the perpendicular condition. That is, the fourth direction and the contact surface between the first fixing element 20 and the display assembly 10 are perpendicular with each other or approximately perpendicular with each other.

In some embodiments, the fixing assembly includes two first fixing elements 20. One of the two first fixing elements 20 fixedly connects between the first part 11 and the first structural member 31. Another first fixing element 20 fixedly connects between the second part 12 and the second structural member 32. In some embodiments, to facilitate the first fixing element 20 to change the length in the third direction and/or the fourth direction, a gap exist between the two first fixing elements 20. The gap corresponds to the first deformable part 13 of the display assembly 10. In the process of changing the relative angle between the first part 11 and the second part 12, the gap between the two first fixing elements 20 accommodates the amount of deformation of the first fixing element 20 and the second fixing element 40.

In some embodiments, the gap between the two first fixing elements 20 has a length in the contact surface between the first fixing element 20 and the display assembly 10 in the direction from the first fixing element 20 to the second fixing element 40, that is tens of times a minimum bending radius of the first deformable part 13 of the display assembly 10. In the process of bending the display assembly 10, the first fixing element 20 may more effectively absorb the deformation formed in the process of changing the relative angle between the first part 11 and the second part 12. It depends on specific circumstances and is not limited by the present disclosure.

Figure 8:
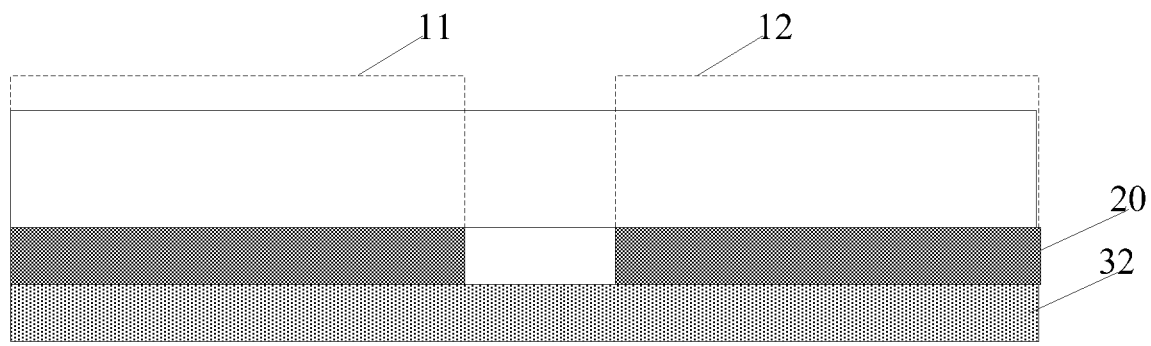
FIG. 8 is a structural diagram illustrating another exemplary electronic device according to some embodiments of the present disclosure.
Figure 9:
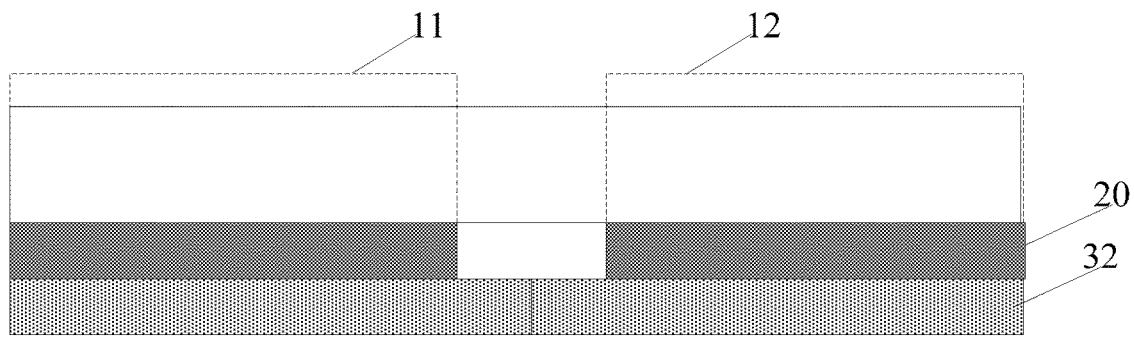
FIG. 9 is a structural diagram illustrating another exemplary electronic device according to some embodiments of the present disclosure.

In some embodiments, the second structural member 32 may include a plurality of sub-structural members. As shown in FIG. 7, different first fixing elements 20 are fixedly connected to different sub-structural members. The second structural member 32 may also be a single-piece structural member. As shown in FIG. 8, different first fixing elements 20 are fixedly connected to the single-piece second structural member 32. It depends on specific circumstances and is not limited by the present disclosure. The second structural member 32 may include the plurality of sub-structural members. When different first fixing elements 20 are fixedly connected to different sub-structural members, gaps may exist between adjacent sub-structural members, as shown in FIG. 7, or may not exist between adjacent sub-structural members, as shown in FIG. 9. It depends on specific circumstances and is not limited by the present disclosure.

In some embodiments, the second structural member 32 includes a support member for fixing configuration of the first part 11 and the second part 12. Specifically, in some embodiments, the second structural member 32 is the support member, thereby simplifying the structure of the electronic device. In some embodiments, the support member is only a part of the second structural member 32. In some embodiments, the second structural member 32 is at least a part of a mainboard of the electronic device. That is, the second structural member 32 may be a certain part of the mainboard or may be the mainboard itself. In some embodiments, the second structural member 32 may also be a structure combining the support member and the mainboard. The present disclosure does not limit thereto. In some other embodiments, the second structural member 32 may be another structure of the electronic device. It depends on specific circumstances and is not limited by the present disclosure.

In some embodiments, the elastic member includes a fixed connection feature and may directly fixedly connect between the display assembly 10 and the second structural member 32. In some embodiments, the elastic member does not include the fixed connection feature. In some embodiments, the first fixing element 20 further includes another fixing element for fixedly connecting between the elastic member and the display assembly 10 and for fixedly connecting between the elastic member and the second structural member 32.

Figure 10:
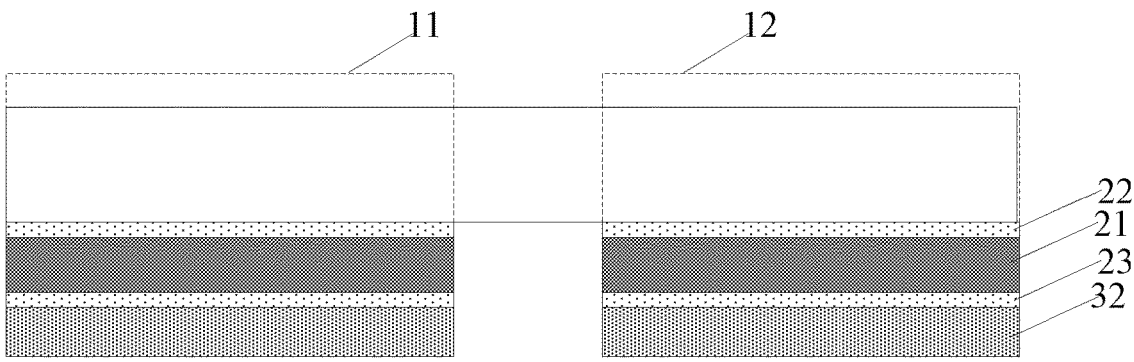
FIG. 10 is a structural diagram illustrating another exemplary electronic device according to some embodiments of the present disclosure.

In some embodiments, as shown in FIG. 10, the first fixing element 20 further includes a first bonding member 22 for bonding a first surface of an elastic member 21 with the display assembly 10 and a second bonding member 23 for bonding a second surface of the elastic member 21 with the second structural member 32. The first bonding member 22 fixedly connect between the elastic member 21 and the display assembly 10. The second bonding member 23 fixedly connect between the elastic member 21 and the second structural member 32. The second surface of the elastic member 21 and the first surface of the elastic member 21 are opposite to each other.

In some embodiments, the elastic member 21 is an elastic member formed by a highly elastic material layer such as an elastic film or a highly elastic rubber. The first bonding member 22 includes an adhesive tape or an adhesive coating. Similarly, the second bonding member 23 includes the adhesive tape or the adhesive coating. It depends on specific circumstances and is not limited by the present disclosure.

In some embodiments, the first bonding member 22 and the second bonding member 23 are elastic members covered by the adhesive layers formed by coating double-sided adhesive. In some embodiments, the first bonding member 22 and the second bonding member 23 are elastic members covered by the adhesive layers formed by coating optical clear adhesive (OCA) film. In some embodiments, the first bonding member 22 and the second bonding member 23 are elastic members covered by the adhesive layers formed by coating a pressure-sensitive adhesive (such as acrylic pressure-sensitive adhesive). In some embodiments, the first bonding member 22 and the second bonding member 23 are elastic members covered by the adhesive layers formed by coating another material. It depends on specific circumstances and is not limited by the present disclosure.

Figure 11:
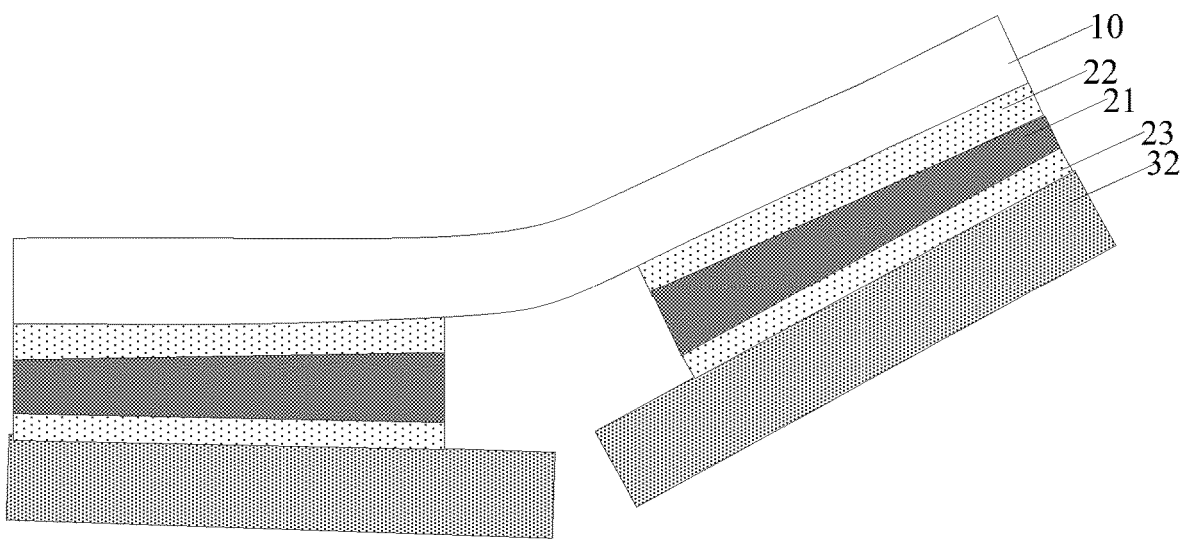
FIG. 11 is a structural diagram illustrating another exemplary electronic device according to some embodiments of the present disclosure.

In some embodiments, as shown in FIG. 11, the deformation trigger threshold of the second deformability of the first fixing element 20 is smaller than a preset force. The preset force is the smallest force among a first force, a second force, a third force, and a fourth force. The first force is capable of separating the first bonding member and the display assembly 10. The second force is capable of separating the first bonding member and the elastic member. The third force is capable of separating the second bonding member and the elastic member. The fourth force is capable of separating the second bonding member and the second structural member. In the process of changing the relative angle between the first part 11 and the second part 12, before the elastic member is separated from the display assembly 10 and/or the second fixing element, the first fixing element 20 deforms first to avoid a debonding symptom, such as the separation between the elastic member and the display assembly 10 or the separation between the elastic member and the second structural member 32 in the process of changing the relative angle between the first part 11 and the second part 12. As such, moisture and dust are prevented from entering the gaps between the display assembly 10 and the first fixing element 20 after the separation, thereby improving the reliability of the display assembly 10.

In some embodiments, the deformation trigger threshold of the second deformability of the first fixing element 20 is also smaller than a connection force between various film layer structures inside the display assembly 10 to avoid cracks of the various film layers inside the display assembly 10 in the process of changing the relative angle between the first part 11 and the second part 12, thereby preventing foreign objects from entering the display assembly 10 causing protrusions and poor appearance.

In some embodiments, the maximum amount of deformation supported by the elastic member in the preset direction is greater than the maximum extension length of the display assembly 10 in the preset direction to avoid break or failure of at least a part of the display assembly 10 when the electronic device is bended to the maximum extent. Specifically, the maximum amount of deformation supported by the elastic member in the third direction is greater than the maximum extension length of the display assembly 10 in the third direction. The maximum amount of deformation supported by the elastic member in the fourth direction is greater than the maximum extension length of the display assembly 10 in the fourth direction.

In some embodiments, the maximum extension length of the display assembly 10 in the preset direction is the extension length of the display assembly 10 in the preset direction when the display assembly 10 is bended to the maximum extent.

Further, the electronic device provided by the embodiments of the present disclosure includes the display assembly and the fixing assembly. The fixing assembly includes at least one fixing element. At least a part of at least one of the first fixing element and the display assembly includes the second deformability. The second deformability is capable of changing the length in the preset direction. In the process of changing the relative angle between the first part and the second part, the second deformability of the first fixing element and/or the display assembly mitigates the stress on the first deformable part of the display assembly, reduces the failure rate of the first deformable part of the display assembly in the process of changing the relative angle between the first part and the second part, and improve the reliability of the electronic device.

Each part of the specification is described in a progressive manner, and each part focuses on the difference from other parts. The same or similar aspects between various parts can be referred to each other.

In the specification, specific examples are used to explain the principles and implementations of the present disclosure. The description of the embodiments is intended to assist comprehension of the methods and core ideas of the present disclosure. At the same time, those of ordinary skill in the art may change or modify the specific implementation and the scope of the application according to the embodiments of the present disclosure. Thus, the content of the specification should not be construed as limiting the present disclosure.

What is claimed is:

1. An electronic device comprising:
a display assembly for displaying images and including a first part and a second part disposed at different sides of a first deformable part of the display assembly, wherein a first deformability of at least a part of the display assembly includes capability to change a relative angle between the first part and the second part; and
a fixing assembly coupled to the display assembly for fixedly connect the display assembly, the fixing assembly including at least a first fixing element;
wherein at least a part of at least one of the first fixing element or the display assembly has a second deformability including capability to change a length in a preset direction.

2. The electronic device according to claim 1, wherein:
the first deformability supports switching the display assembly from a first attitude to a second attitude;
in the first attitude, the first part and the second part of the display assembly satisfy a coplanar condition; and
in the second attitude, the first part and the second part of the display assembly satisfy an overlapping condition.

3. The electronic device according to claim 2, wherein:
in the first attitude, the first fixing element provides a pulling force to the display assembly; and
when being pulled by the pulling force, the first part and the second part has at least a tendency of moving away from each other.

4. The electronic device according to claim 3, wherein:
the second deformability includes capability to resume a natural state in a direction opposite to the preset direction; and
in the first attitude, the first fixing element has a tendency of resuming the natural state in the direction opposite to the preset direction, and the tendency of resuming the natural state in provides the pulling force to the display assembly, such that the first part and the second part have a tendency of moving away from each other.

5. The electronic device according to claim 1, wherein:
at least a part of the first fixing element and at least a part of the display assembly both have the second deformability; and
a deformation trigger threshold of the second deformability of at least a part of the first fixing element is smaller than a deformation trigger threshold of the second deformability of at least a part of the display assembly.

6. The electronic device according to claim 2, wherein:
the preset direction includes a first direction, and the second deformability includes capability to change a length in the first direction and changes the length of the electronic device in the first direction;
the electronic device includes a first surface having a first side and a second side opposite to each other, the first surface and a display panel of the display assembly satisfying a coplanar condition in the first attitude, the first side being located at a side of the first part facing away from the second part, and the second side being located at a side of the second part facing away from the first part; and
the length of the electronic device in the first direction is a distance between the first side and the second side in the first surface.

7. The electronic device according to claim 1, wherein:
the preset direction includes a second direction, the second deformability includes capability to change a length in the second direction, and the second direction and the display assembly satisfy a perpendicular condition.

8. The electronic device according to claim 1, further comprising a structural member, wherein:
the structural member includes a first structural member located at a side of the display assembly;
the first fixing element is located between the display assembly and the first structural member;
a first end of the first fixing element is connected to an end surface of the display assembly facing toward the first structural member; and
a second end of the first fixing element is connected to an end surface of the first structural member facing toward the display assembly.

9. The electronic device according to claim 8, wherein:
the first fixing element is an elastic member having the second deformability.

10. The electronic device according to claim 8, wherein:
the fixing assembly includes two first fixing elements and two second fixing elements;
the display assembly includes a first side surface and a second side surface opposite to each other;
the two first fixing elements, located between the first side surface of the display assembly and an end surface of the first structural member facing toward the first side surface, fixedly connect between the display assembly and the first structural member;
the two second fixing elements, located between the second side surface of the display assembly and an end surface of the first structural member facing toward the second side surface, fixedly connect between the display assembly and the first structural member; and
the first side surface is a side surface of the first part facing away form the second part, and the second side surface is a side surface of the second part facing away from the first part.

11. The electronic device according to claim 8, wherein:
the fixing assembly includes four first fixing elements;
the display assembly includes a first side surface and a second side surface opposite to each other;
two of the four first fixing elements, located between the first side surface of the display assembly and an end surface of the first structural member facing toward the first side surface, fixedly connect between the display assembly and the first structural member;
another two of the four first fixing elements, located between the second side surface of the display assembly and an end surface of the first structural member facing toward the second side surface, fixedly connect between the display assembly and the first structural member; and
the first side surface is a side surface of the first part facing away form the second part, and the second side surface is a side surface of the second part facing away from the first part.

12. The electronic device according to claim 1, further comprising a structural member, wherein:
the structural member includes a second structural member located at a side of the display assembly facing away from a display panel of the display assembly;

the first fixing element, located between the display assembly and the second structural member, fixedly connect between the display assembly and the second structural member;

the first fixing element is an elastic member made of elastic material and having the second deformability;

the second deformability is capable of changing a length in a third direction and changing a length in a fourth direction;

the third direction and a contact surface between the first fixing element and the display assembly satisfy a parallel condition;

the fourth direction and the contact surface between the first fixing element and the display assembly satisfy a perpendicular condition;

the fixing assembly includes two first fixing elements;

one of the two first fixing elements fixedly connects between the first part and the first structural member;

another of the two first fixing elements fixedly connect between the second part and the second structural member;

a gap exists between two first fixing elements; and the gap corresponds to the first deformable part of the display assembly.

13. The electronic device according to claim 12, wherein the first fixing element further includes:

a first bonding member for bonding a first surface of the elastic member and the display assembly; and a second bonding member for bonding a second surface of the elastic member and the second structural member;

wherein the first surface of the elastic member and the second surface of the elastic member are opposite to each other;

a deformation trigger threshold of the second deformability of the first fixing element is smaller than a preset force;

the preset force includes the minimum force among a first force, a second force, a third force, and a fourth force;

the first force is capable of separating the first bonding member and the display assembly;

the second force is capable of separating the first bonding member and the elastic member;

the third force is capable of separating the second bonding member and the elastic member; and the fourth force is capable of separating the second bonding member and the second structural member.

* * * * *